(12) United States Patent
Itokawa

(10) Patent No.: US 7,058,128 B1
(45) Date of Patent: Jun. 6, 2006

(54) IMAGE EDITING APPARATUS AND METHOD

(75) Inventor: Osamu Itokawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1135 days.

(21) Appl. No.: 09/708,623

(22) Filed: Nov. 9, 2000

(30) Foreign Application Priority Data

Nov. 12, 1999 (JP) ............................. 11-323194

(51) Int. Cl.
*H04N 7/12* (2006.01)
*G06K 9/46* (2006.01)

(52) U.S. Cl. ................ 375/240.08; 382/203; 348/397.1
(58) Field of Classification Search ............ 375/240.08, 375/240.09, 240.1, 240.05, 240.16; 348/397.1, 348/399.1, 420.1, 422.1; 382/203, 236, 242, 382/243; 709/217
See application file for complete search history.

(56) References Cited

U.S. PATENT DOCUMENTS

| | | | | | |
|---|---|---|---|---|---|
| 5,790,196 | A | * | 8/1998 | Sun et al. .............. | 375/240.05 |
| 6,026,195 | A | * | 2/2000 | Eifrig et al. ................. | 382/236 |
| 6,035,070 | A | * | 3/2000 | Moon et al. ................. | 382/243 |
| 6,057,884 | A | * | 5/2000 | Chen et al. ............. | 375/240.16 |
| 6,092,107 | A | * | 7/2000 | Eleftheriadis et al. ...... | 709/217 |
| 6,483,874 | B1 | * | 11/2002 | Panusopone et al. .. | 375/240.08 |

* cited by examiner

*Primary Examiner*—Gims Philippe
(74) *Attorney, Agent, or Firm*—Fitzpatrick, Cella, Harper & Scinto

(57) ABSTRACT

A shape decoder obtains shape data by decoding bit-stream data representing a shape, and a texture decoder obtains texture information by decoding a texture bit stream. A shape manipulation unit alters the shape data based upon an operation performed by user. In response to the end of shape manipulation processing, a texture altering unit alters the corresponding texture data in dependence upon updating of the shape data applied by the shape manipulation unit. As a result, processing for manipulating, editing and displaying an image comprising shape data and texture data can be performed more efficiently.

29 Claims, 17 Drawing Sheets

FIG. 7
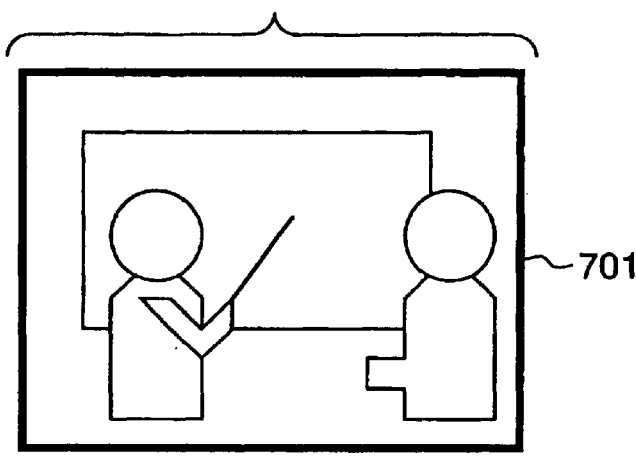
701
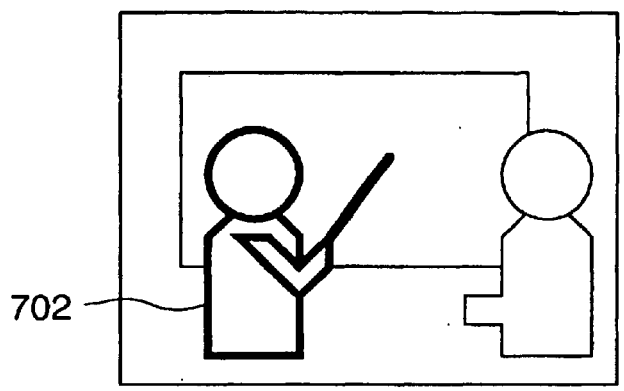
702
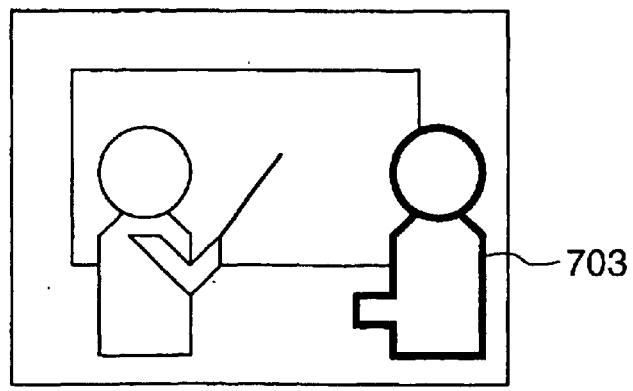
703
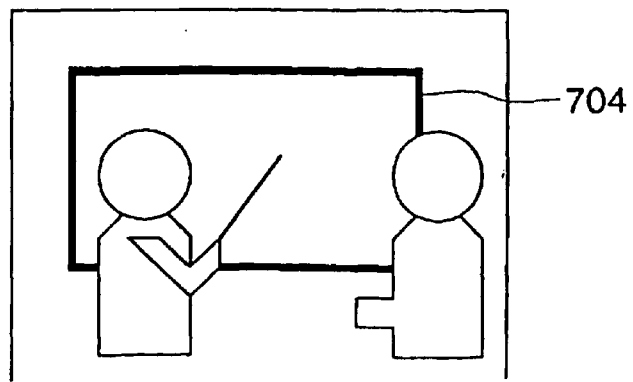
704

IMAGE EDITING APPARATUS AND METHOD

FIELD OF THE INVENTION

This invention relates to an image editing apparatus and method for subjecting an object in an image to an editing operation.

BACKGROUND OF THE INVENTION

An idea that is currently the focus of attention is to capture a moving image as an image constituted by a synthesis of units referred to as "objects" corresponding to the content of the image. A moving-image encoding scheme referred to as "MPEG-4" is characterized in that it is possible perform encoding on a per-object basis. Efforts to standardize such encoding are currently being made. In accordance with this encoding scheme, both object editing and manipulation are facilitated because the units of processing are objects.

An object can take on any shape and is composed of a combination of shape data representing the shape information of the object, and texture data representing the surface pattern of the object.

A variety of image editing operations are known generally, examples of which are time-sequence substitution, adjustment of color tones and insertion of separate images. In the main, however, editing operations are performed on a frame-by-frame basis. Object extraction using a blue backdrop is known as an example of editing on an object-by-object basis. This involves preparing a blue background at a studio set or the like in advance, effecting segmentation into blue and non-blue portions by a switcher and combining other images with the blue portions.

However, in cases where an object that has been extracted by the blue backdrop method is subjected to manipulation again, it is difficult to execute processing using only image data. Accordingly, when it is desired to manipulate an object again, it is necessary to preserve data indicating the positions of the blue and non-blue portions in advance. In accordance with MPEG-4, shape data is referred to as a shape and the data of the image itself is referred to as texture.

On the other hand, a problem that arises with editing and remanipulation on an object-by-object basis is that two types of data, namely shape data and texture data, must always be processed as a set. Since the processing of texture in particular involves a heavy processing load, another problem is a large delay in presenting a display during manipulation and editing.

SUMMARY OF THE INVENTION

Accordingly, an object of the present invention is to make it possible to limit a decline in processing speed at manipulation of a moving image comprising a set of shape data and texture data and to display or print a manipulated image rapidly.

According to the present invention, the foregoing object is attained by providing an image editing apparatus for editing object image data comprising shape data and texture data, comprising: input means for inputting image data consisting of shape data and texture data; separation means for separating the image data into the shape data and texture data; shape manipulation means for manipulating the shape data separated from the image data by said separation means; and texture manipulation means for manipulating the texture data in conformity with result of manipulation by said shape manipulation means after processing by said shape manipulation means ends.

Further, according to the present invention, the foregoing object is attained by providing an image editing apparatus comprising: read-out means for reading a bit stream, which has been compressed and encoded, out of a storage device; separation means for separating the bit stream, which has been read out by said read-out means, into at least a bit stream of shape information and a bit stream of texture information on a per-object basis; decoding means for decoding, object by object, each bit stream obtained by separation by said separation means, thereby generating shape data and texture data; manipulation means for manipulating the shape data, which has been obtained by said decoding means, based upon a manipulation command from a user; altering means responsive to a predetermined command operation, which is not accompanied by manipulation of shape data, for altering the texture data in conformity with the manipulation of the shape data by said manipulation means; re-encoding means for re-encoding the shape data that has been manipulated by said manipulation means and the texture data that has been altered by said altering means; and write means for comparing a bit stream that has been re-encoded by said re-encoding means and the bit stream that has been obtained by said separation means, updating bit streams of portions that have been altered and writing the result to the storage device.

According to another aspect of the present invention, the foregoing object is obtained by providing an image editing apparatus comprising: input means for inputting image data consisting of shape data and texture data; separation means for separating the image data into the shape data and texture data; shape manipulation means for manipulating the shape data separated from the image data by the separation means; and texture manipulation means for manipulating the texture data in conformity with result of manipulation by the shape manipulation means after processing by the shape manipulation means ends.

Further, according to the present invention, the foregoing object is attained by providing an image editing method executed by the above-described image editing apparatus, as well as a storage medium storing a control program for causing a computer to implement this image editing method.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a diagram illustrating an example of displays in which shapes in a selected state are displayed in an identifiable manner;

DESCRIPTION OF THE PREFERRED EMBODIMENTS

Preferred embodiments of the present invention will now be described in detail in accordance with the accompanying drawings.

First Embodiment

Image objects are constructed in units referred to as "video object planes" (VOP), and a moving image is generated by combining a plurality of VOPs.

Figure 9:
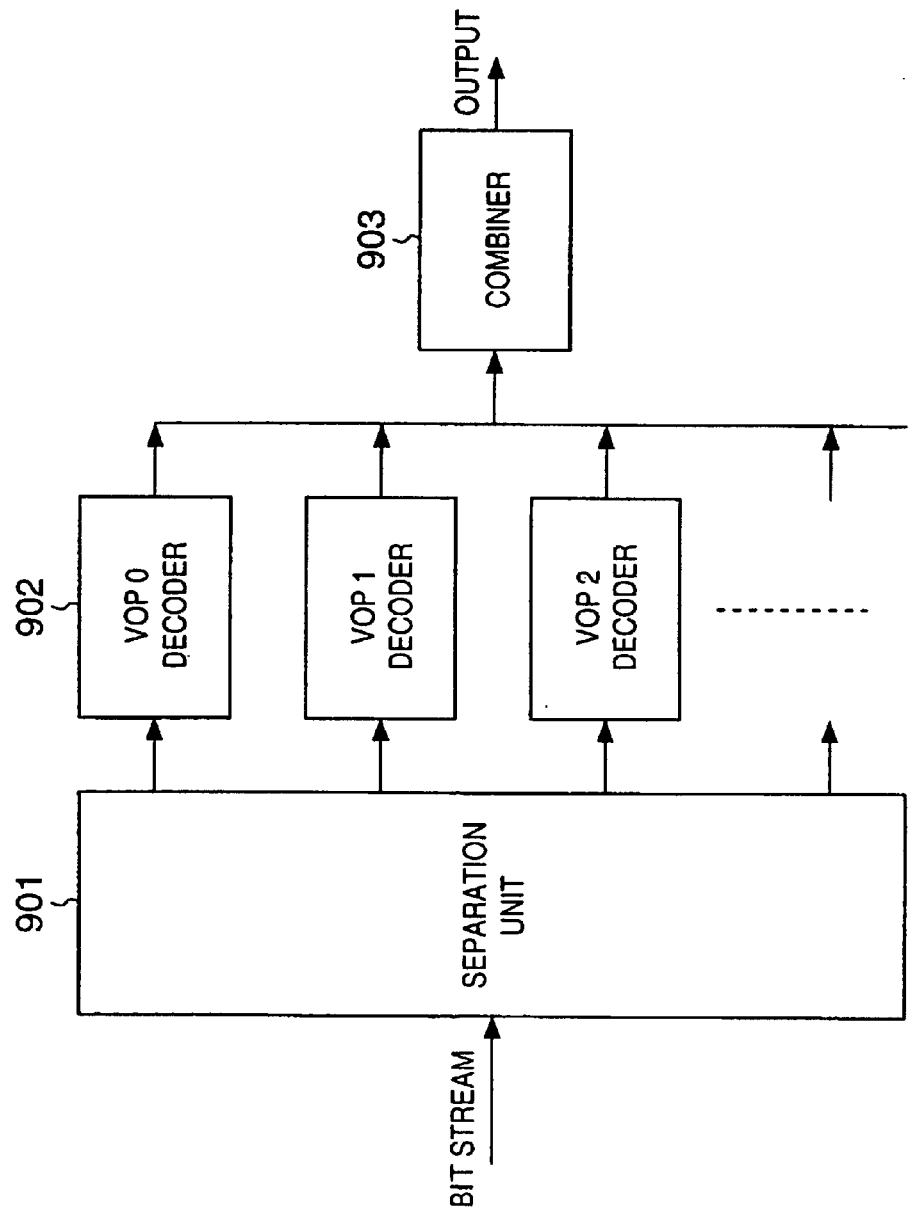
FIG. 9 is a block diagram illustrating the structure of a decoder for decoding the bit stream of multiplexed images.

FIG. 9 is a block diagram illustrating the structure of a decoder for decoding the bit stream of multiplexed images. As shown in FIG. 9, an input bit stream is separated into bit streams of individual VOPs by a separation unit 901. A VOP decoder 902 decodes each individual VOP. The decoded video objects are reconstructed into a moving image of successive individual frames by a combiner 903.

Figure 1:
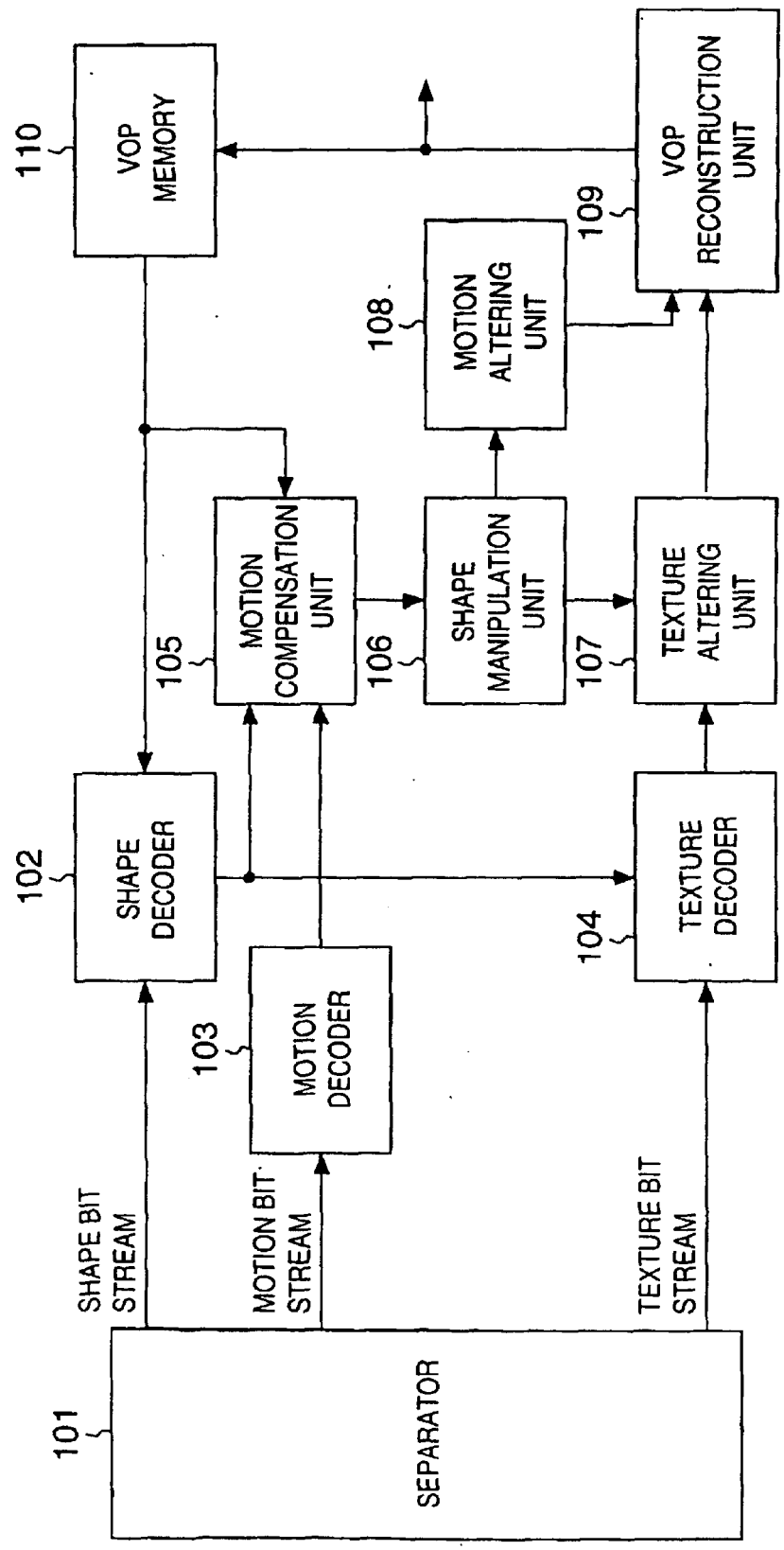
FIG. 1 is a block diagram illustrating the overall structure of an image editing apparatus according to a first embodiment of the present invention.

FIG. 1 is a block diagram illustrating the overall structure of an image editing apparatus according to a first embodiment of the present invention. FIG. 1 shows one VOP decoder 902 in the decoder depicted in FIG. 9. The bit stream of one VOP separated by the separation unit 901 is separated into shape, motion and texture bit streams by a separator 101. A shape is binary or multilevel shape information and is decoded by a shape decoder 102. The bit stream relating to motion is data which indicates amount of motion in a case where use is made of encoding utilizing correlation along the time axis. This bit stream is decoded by a motion decoder 103. A motion compensation unit 105 performs motion compensation based upon a VOP (stored in a VOP memory 110) decoded previously in time and the present decoded shape and motion data. Complete shape information is thus obtained from the shape and motion bit streams.

A texture decoder 104 decodes texture. A VOP reconstruction unit 109 reconstructs the VOP based upon the above-mentioned shape and texture information. In a case where a shape is not to be subjected to manipulation, a texture altering unit 107 does not operate and the motion information is sent to the VOP reconstruction unit 109 without a motion altering unit 108 applying any processing as well.

If a shape has been manipulated by a shape manipulation unit 106, the alteration of the shape is accompanied by alteration of motion by a motion altering unit 108 and by alteration of texture by the texture altering unit 107, after which VOP reconstruction is performed by the VOP reconstruction unit 109.

The flow of a series of processes executed at the time of shape manipulation will now be described with reference to FIG. 2.

Figure 2:
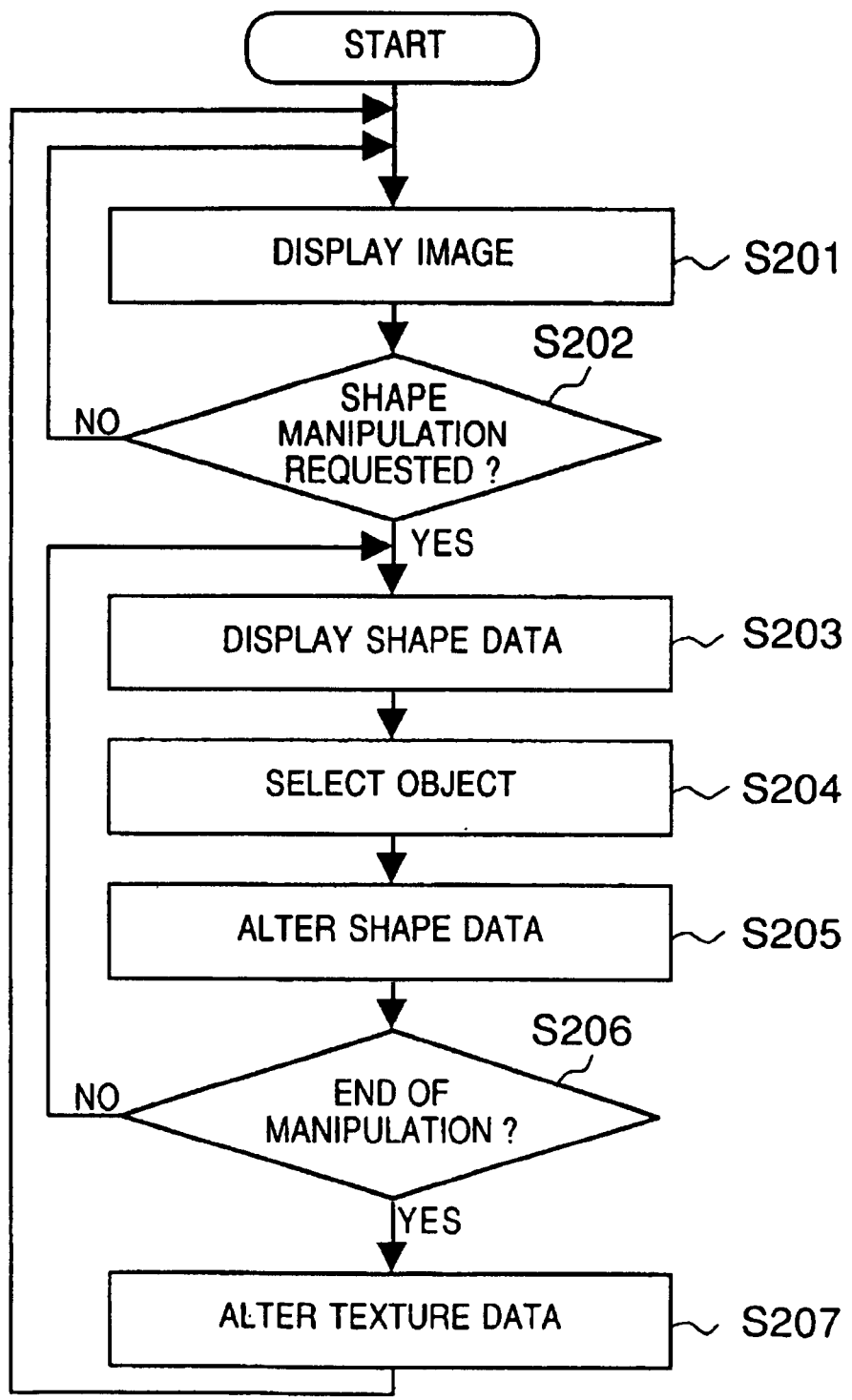
FIG. 2 is a flowchart illustrating the procedure of image editing processing according to the first embodiment.
Figure 3:
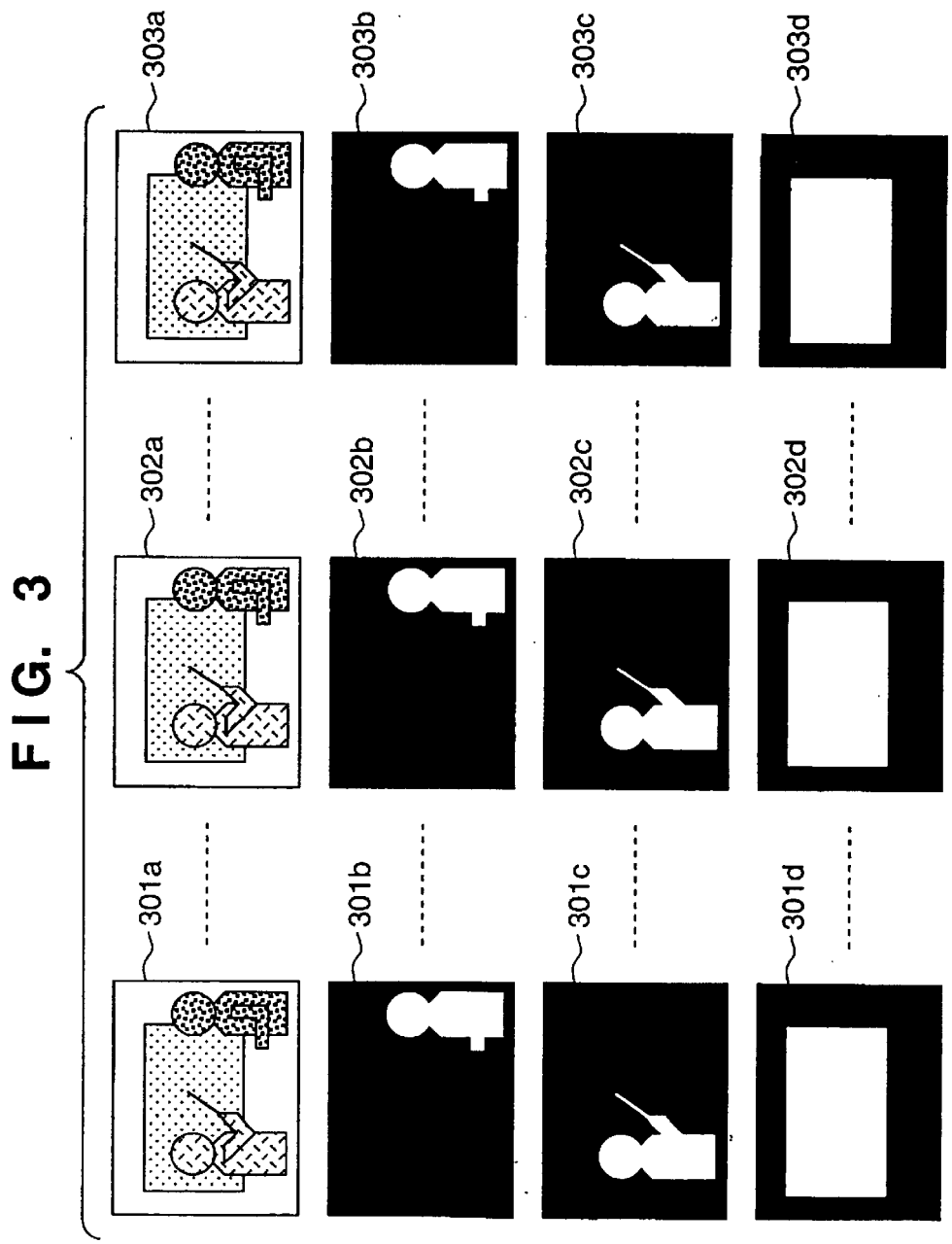
FIG. 3 is a diagram illustrating an example of display images and shapes of individual video objects.
Figure 5:
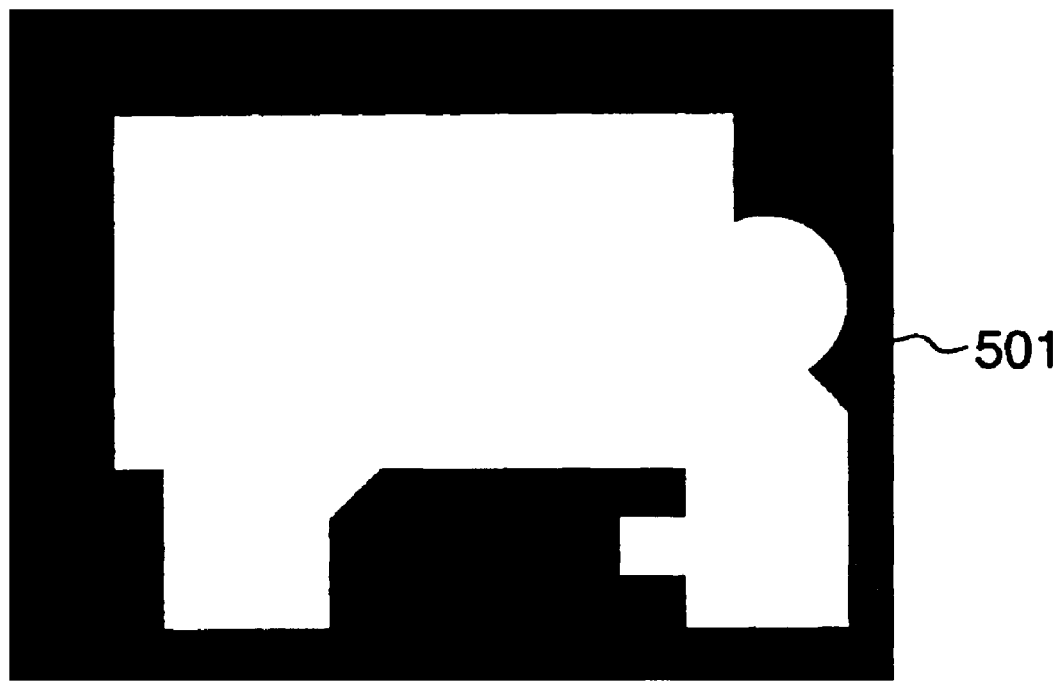
FIG. 5 is a diagram illustrating an example in which shape data is displayed.

FIG. 2 is a flowchart illustrating the procedure of image editing processing according to the first embodiment. As shown in FIG. 2, an image that is the result of decoding continues to be displayed as is until a request for shape manipulation arrives. (steps S201, S202). In FIG. 3, reference characters 301*a* to 303*a* represent these screens. When a shape manipulation request is generated, the image displayed thus far is switched over to shape data (steps S202, S203). FIG. 5 is a diagram illustrating an example in which shape data is displayed. This example is a combination of three objects, namely a person on the left side, a person on the right side and a board in back, in addition to the background.

Figure 6:
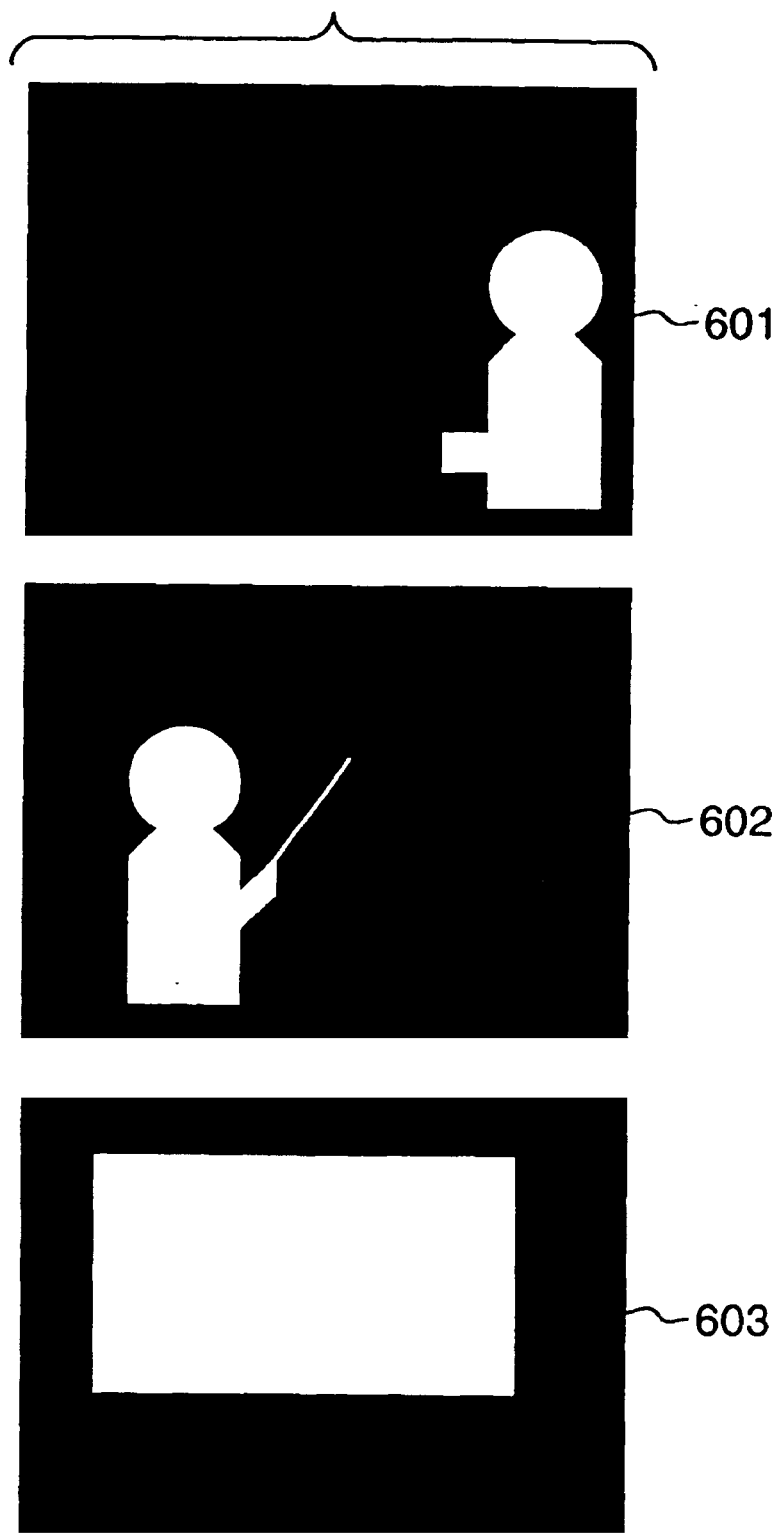
FIG. 6 is a diagram in which the shapes of objects shown in FIG. 5 are represented individually.

FIG. 6 is a diagram in which the shapes of the objects shown in FIG. 5 are represented individually. Identification information of some kind is necessary in order for the shapes of these three objects to be distinguishable from one another on a single screen. Various methods of making the objects identifiable are conceivable. For example, they can be distinguished by color, information possessed by the object can be displayed by text data, and an object can be made to flash. With a plurality of objects thus being displayed in an identifiable manner, the object desired to be manipulated is selected (step S204) and the shape data is altered (step S205).

Figure 8:
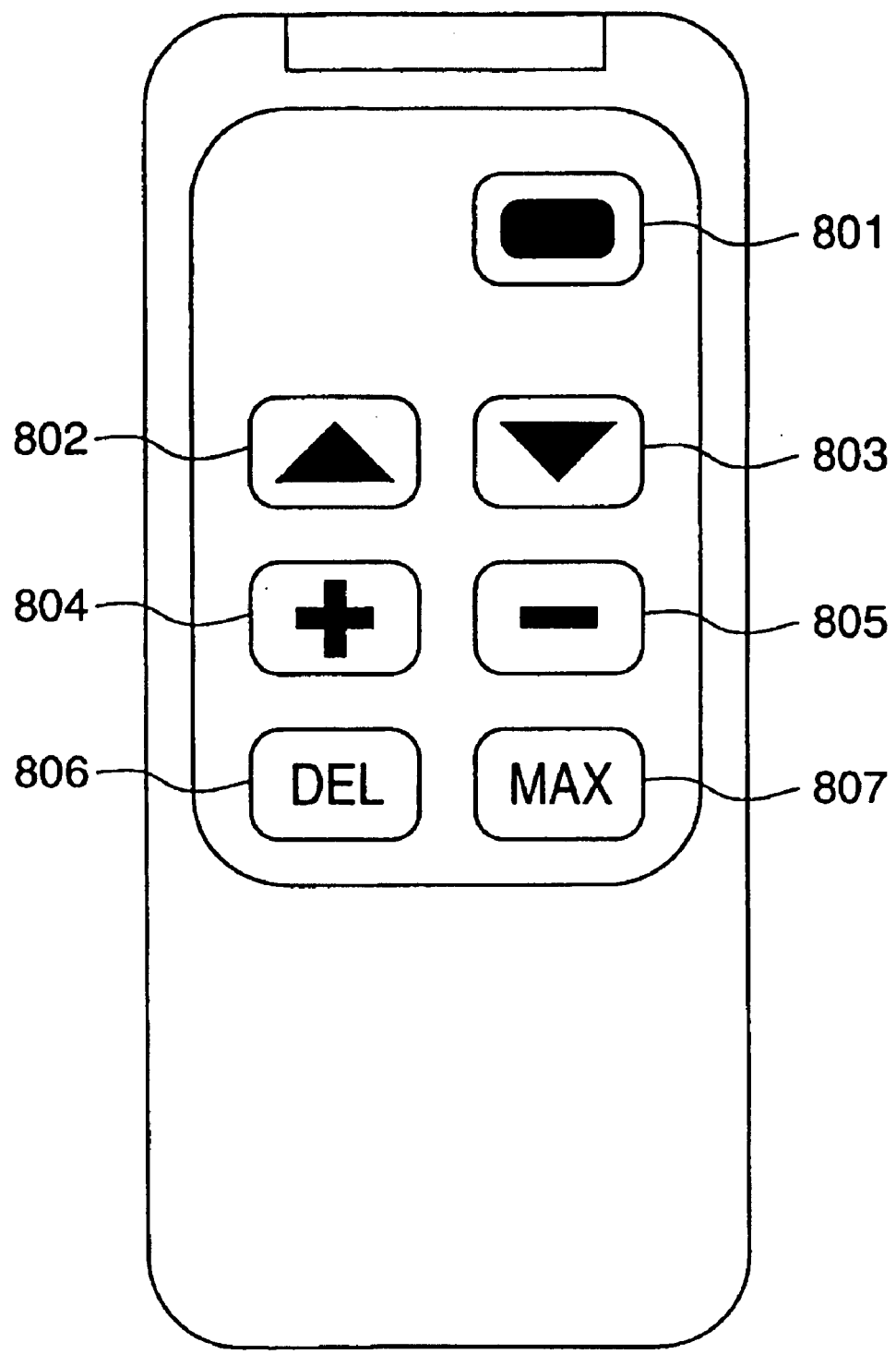
FIG. 8 is a diagram illustrating a remote controller for manipulating shape data.

FIG. 7 is a diagram illustrating an example of displays in which shapes in a selected state are displayed in an identifiable manner, and FIG. 8 is a diagram illustrating a remote controller for manipulating shape data. An example of an operation for altering shape data according to the first embodiment will be described with reference to FIGS. 7 and 8.

A shape manipulation request is generated (step S202) and the display on the screen assumes the shape-data display mode (step S203), as shown in FIG. 7, by pressing a remote control button 801. An object indicated by a bold line in FIG. 7 signifies shape data that is to be manipulated. In FIG. 7, an object in a selected state is indicated by the solid line. However, it goes without saying that other methods of indication may be used. For example, an object in a selected state may be indicated by changing its color. By pressing remote control buttons 802 and 803, an object to be manipulated is selected (step S204). By pressing remote control buttons 804 to 807, the object in the selected state is manipulated.

By way of example, whenever button 802 on the remote controller is pressed, the object to be manipulated changes from 701 to 702, from 702 to 703 and from 703 to 704 in FIG. 7. Whenever button 803 on the remote controller is pressed, the object to be manipulated changes from 704 to 703, from 703 to 702 and from 702 to 701. If object 702, for example, is decided on as the object to be manipulated and a remote control button (DEL) 806 is pressed, then the shape data of object 702 will be erased. If remote control button 807 (MAX) is pressed, only the shape data of object 702 is displayed and the size thereof is maximized.

Remote control button (+) 804 is for enlarging a selected object at a prescribed magnification, and remote control button (−) 805 is for reducing a selected object at a prescribed magnification.

Figure 4:
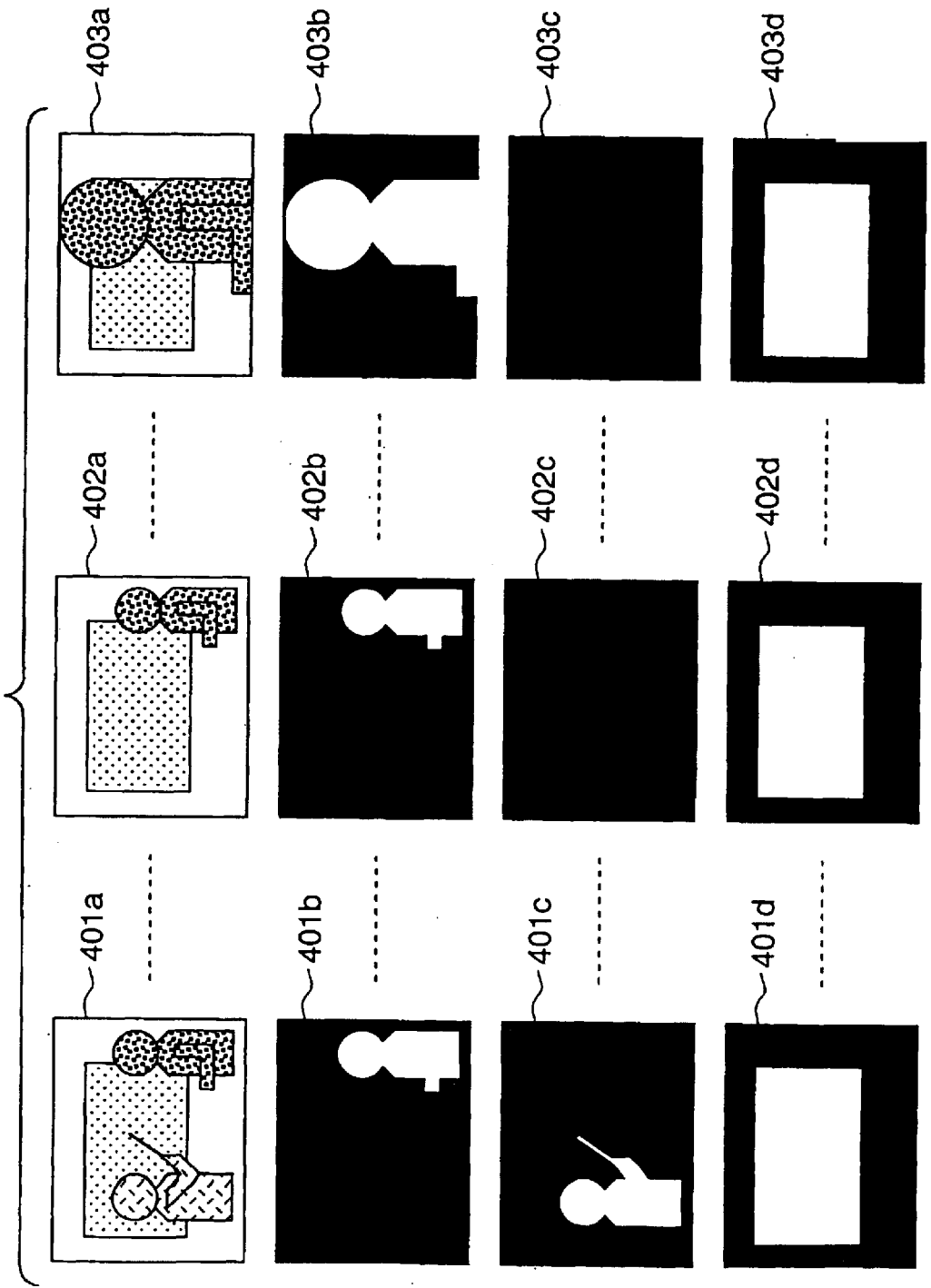
FIG. 4 is a diagram illustrating an example of display images and manipulation of shapes.

Reference characters 401c to 402c in FIG. 4 indicate the manner in which the shape data of object 702 is erased. Further, if object 703 is decided on as the object to be manipulated and the remote control button (+) 804 is pressed, the shape data of object 703 is enlarged. If the remote control button (−) 805 is pressed, the shape data of object 703 is reduced in size. Reference characters 430b in FIG. 4 indicate the manner in which the shape data of object 703 is enlarged.

Steps S203 to S206 in FIG. 2 are repeated until the user is satisfied with the result of the alteration of shape data. If remote control button 801 in FIG. 8 is then pressed, the altered shape data is decided. When the alteration of the shape data has been decided, alteration of texture data (step S207) is carried out. The display screen after alteration of texture data is indicated at 403a in FIG. 4. Specifically, the reference characters 403a indicate a state obtained by altering texture in conformity with the enlarged shape and then displaying the texture.

This embodiment has been described in regard to an example in which a remote controller is used to manipulate shape data. However, in a case where operation is performed while observing a monitor connected to a computer, a keyboard and/or mouse may be used instead of the remote controller.

In accordance with the first embodiment, as described above, only shape data is manipulated and displayed at the time of a shape altering operation; no manipulation is applied to texture data, the data content of which takes time to alter, at such time. After the manipulation of shape data has been decided, an alteration in conformity with this manipulation is applied to texture. As a result, it is possible for the user to rapidly check the result of the shape altering operation. This improves operability.

In this embodiment, the alteration of texture data starts in response to a command to end the manipulation of shape data (steps S206, S207). However, an arrangement may be adopted in which if there are a plurality of objects and an object whose shape data is to be manipulated is changed over, the manipulation of the corresponding texture data begins.

Second Embodiment

A second embodiment will now be described in detail. This embodiment relates to the editing of a bit stream of a moving image that supports objects.

Figure 10:
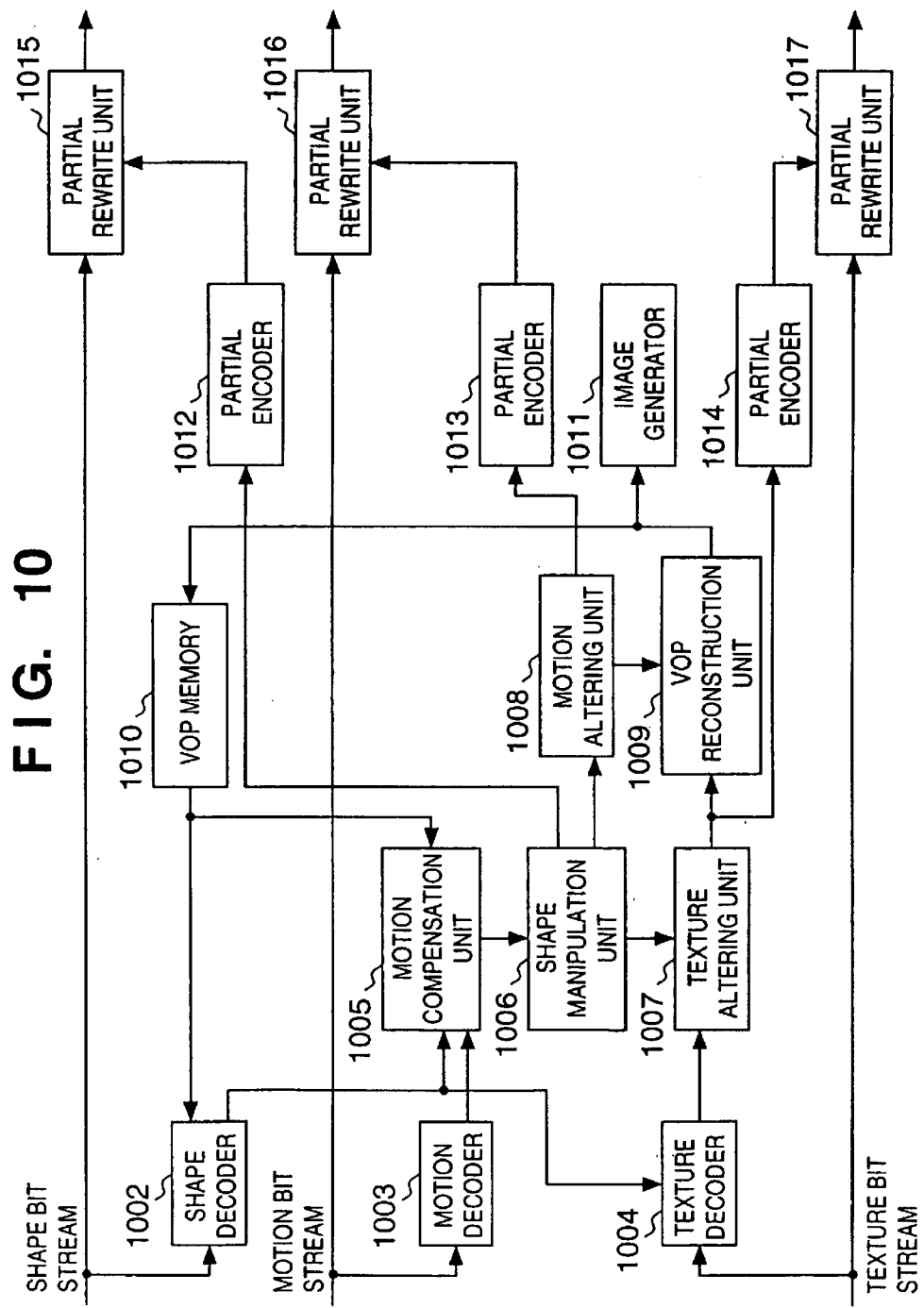
FIG. 10 is a block diagram illustrating the overall structure of an image editing apparatus according to a second embodiment of the present invention.

FIG. 10 is a block diagram illustrating the overall structure of an image editing apparatus according to a second embodiment of the present invention. Here processing is executed to read each bit stream out of a temporary storage device such as a hard disk and write the bit streams to the temporary storage device again after manipulation and editing.

The components from a shape decoder 1002 to a VOP memory 1010 in FIG. 10 correspond to the components from the shape decoder 102 to the VOP memory 110, respectively, in the first embodiment.

In a manner similar to that of the first embodiment, a manipulation performed by the shape manipulation unit 1006 makes it necessary for the motion altering unit 1008 or texture altering unit 1007 or both to execute processing, depending upon the content of the manipulation performed by the shape manipulation unit 1006. After such processing has been executed, VOP reconstruction is carried out by the VOP reconstruction unit 1009, the resulting data is stored in the VOP memory 1010 for frame-to-frame processing, and processing for displaying the image is executed in an image generator 1011.

Only the processing of one VOP is described in connection with FIG. 10. However, if an image comprises a plurality of VOPs, it will be necessary to combine these VOPs when a display is presented.

Updating of shape data that has been produced in association with the manipulation of a shape is carried out in a partial encoder 1012 by re-encoding the data of this portion. A partial rewrite unit 1015 compares the output of the partial encoder 1012 with the original bit stream and updates only the bit stream of a portion that has been altered.

In a case where alteration of motion has been performed by a motion altering unit 1008 in association with the manipulation of a shape in the shape manipulation unit 1006, the altered portion is encoded again by a partial encoder 1013, a partial rewrite unit 1016 compares the output of the partial encoder 1013 with the original bit stream and updates only the bit stream of a portion that has been altered.

In a case where alteration of texture has been performed by a texture altering unit 1007 in association with the manipulation of a shape in the shape manipulation unit 1006, the altered portion is encoded again by a partial encoder 1014, a partial rewrite unit 1017 compares the output of the partial encoder 1014 with the original bit stream and updates only the bit stream of a portion that has been altered. Furthermore, it is unnecessary for an alteration of texture to be performed immediately in conformity with an alteration shape in the shape manipulation unit 1006; it will suffice to alter texture when alteration of a shape has been finalized. The timing of these operations will be described later.

Image editing processing according to the second embodiment will now be described with reference to FIG. 11.

Figure 11:
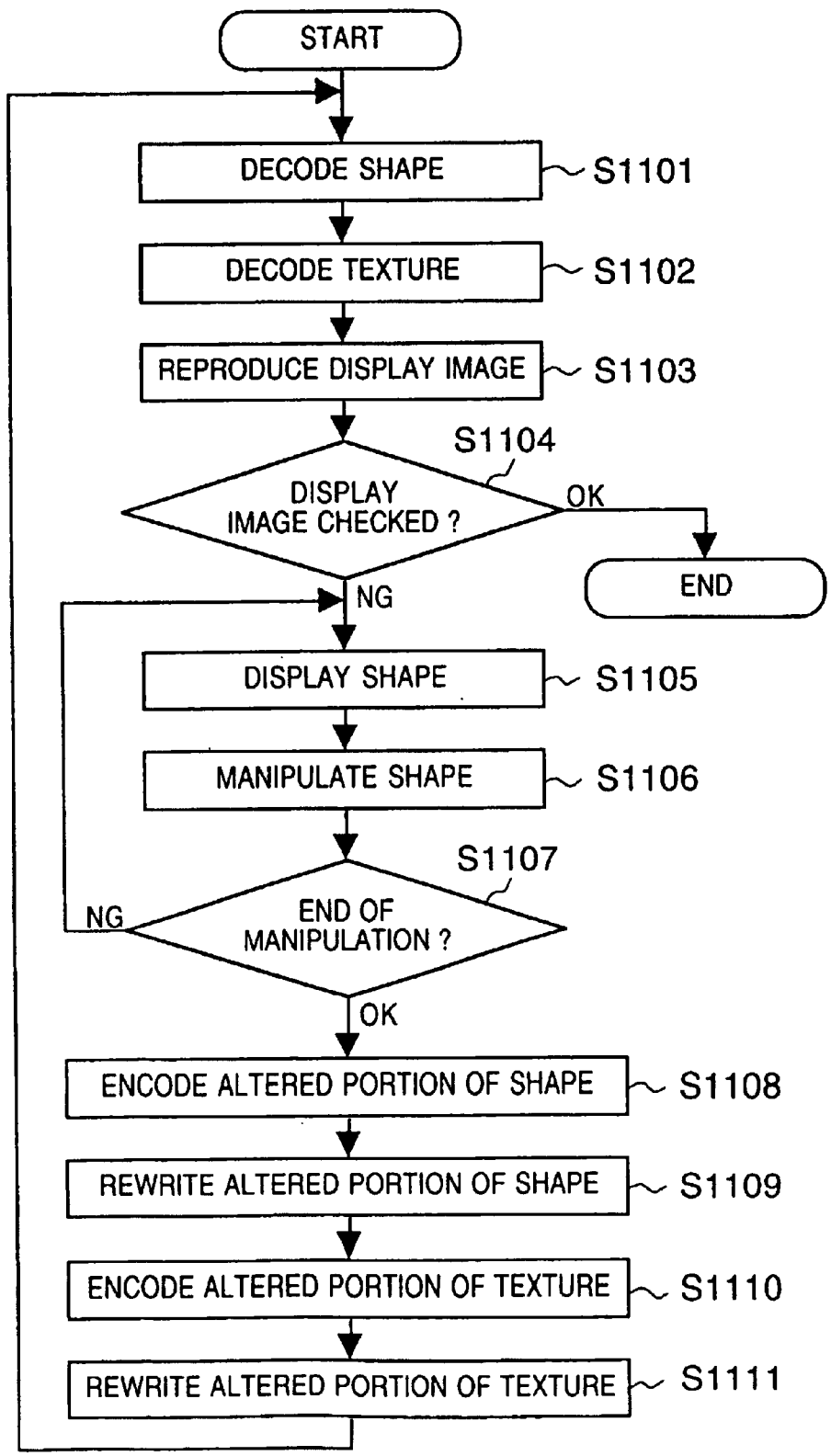
FIG. 11 is a flowchart illustrating the procedure of image editing processing according to the second embodiment.

FIG. 11 is a flowchart illustrating the procedure of image editing processing according to the second embodiment. As shown in FIG. 11, in order to display an image prior to editing, shape decoding (step S1101) and texture decoding (step S1102) are executed and the result is displayed on a screen (step S1103).

The operator checks the displayed image and indicates whether or not shape manipulation is to be performed (step S1104). In a case where the operator has indicated that shape manipulation is to be carried out, first the shape is displayed (step S1105) and then the displayed shape is subjected to manipulation by an input device such as a mouse (step S1106). If there are a plurality of shapes, the operator selects the shape to be manipulated and then instructs that manipulation is to be performed, as described earlier in connection with the first embodiment. Steps S1105 and S1106 are repeated during the manipulating operation; texture is not altered. The purpose of this is to reduce the processing time that accompanies the generation of texture data.

When end of manipulation has been determined as in response to a command to terminate manipulation (step S1107), the altered portion of the shape is encoded (step S1108), a comparison is made with the original bit stream and the portion that has been altered is rewritten (step S1109). If a portion of the texture has been altered in association with an alteration of the shape, then this portion is encoded (step S1110). Partial rewrite of the bit stream is performed in regard to the texture data as well in a manner similar to that of the shape data (step S1111). Control then returns to step S1101, where shape decoding, decoding of texture (step S1102) and reproduction of the display image (step S1103) are executed again.

Figure 12:
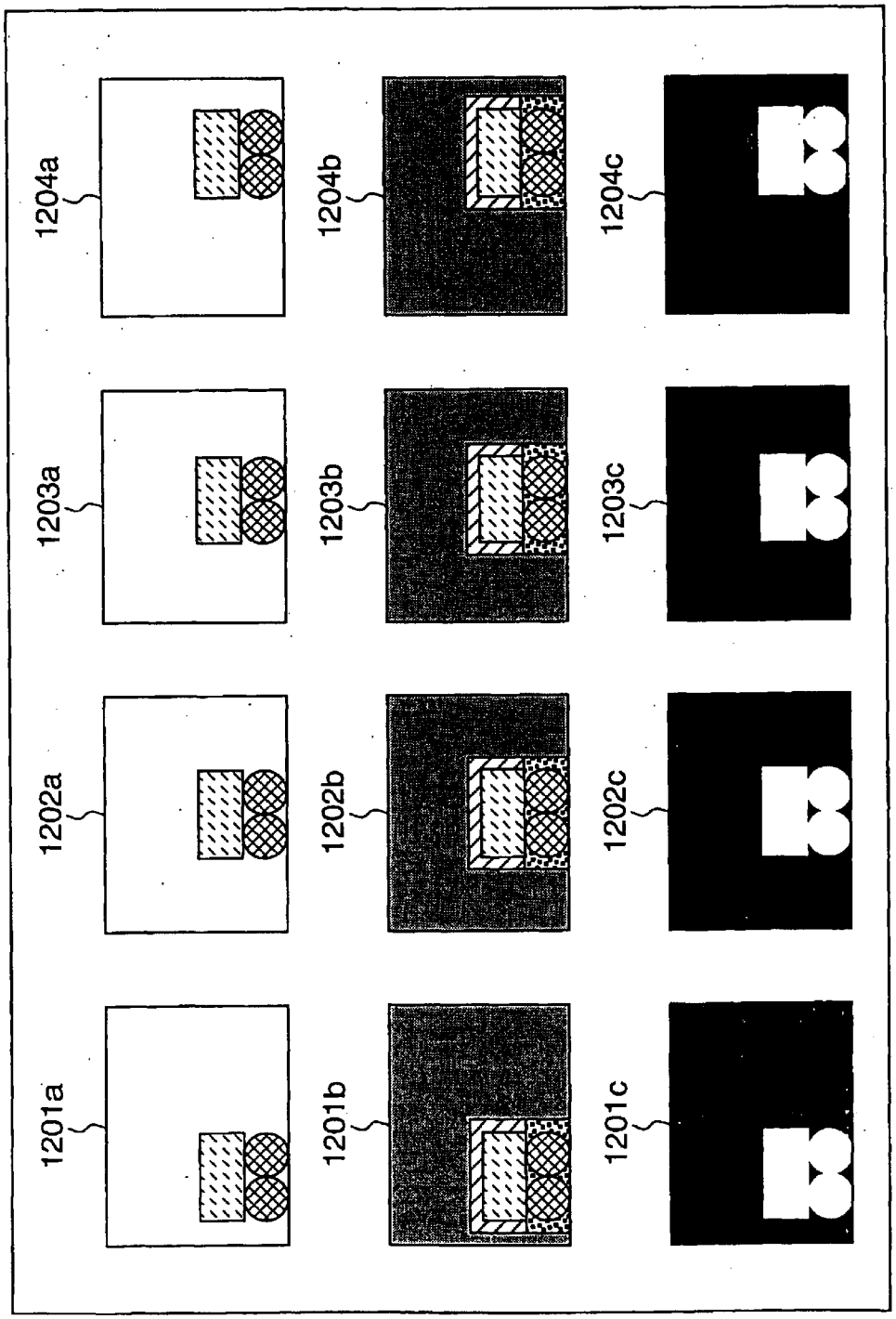
FIG. 12 is a diagram illustrating an example of screen displays.

FIG. 12 is a diagram illustrating an example of screen displays. Reference characters 1201b to 1204b denote texture data decoded at various times. The texture data is a rectangle (here identical with the frame size), and pixels outside the object have data embedded by processing referring to as padding.

Padding will be described in detail. With regard to texture data of a certain shape, the portion of the texture outside the shape is replaced with another image at the time of decoding and combining. When texture data is encoded, therefore, it is unnecessary to send the portion that is external to the shape. Accordingly, if all texture data situated outside the shape is processed upon being made gray in color, the efficiency of encoding will be improved. As for the portion immediately exterior to an object, encoding efficiency is improved more by copying the data at the edge of the object than by replacing this portion with gray data. Such processing is referred to as padding processing in MPEG-4. In FIG. 12, padding processing based upon copying of pixels is applied to the block that surrounds the immediate exterior of the object, and padding based upon gray pixels is applied to the portion located farther to the outside of the object. It should be noted that the above-mentioned padding processing is for raising encoding efficiency and does not necessarily require execution. Data that has not been subjected to padding processing can be processed in the decoding processing illustrated in this embodiment, and it goes without saying that whether padding processing is executed or not has no influence whatsoever upon the effects obtained by this embodiment.

The exterior and interior of the object are identified by shape data indicated at 1201c to 1204c. Accordingly shape data from 1201c to 1204c is obtained at step S1101 in FIG. 11 and texture data from 1201b to 1204b is obtained at step S1102. Display image data from 1201a to 1204a resulting from combination of the shape data and texture data is obtained at step S1103.

Figure 13:
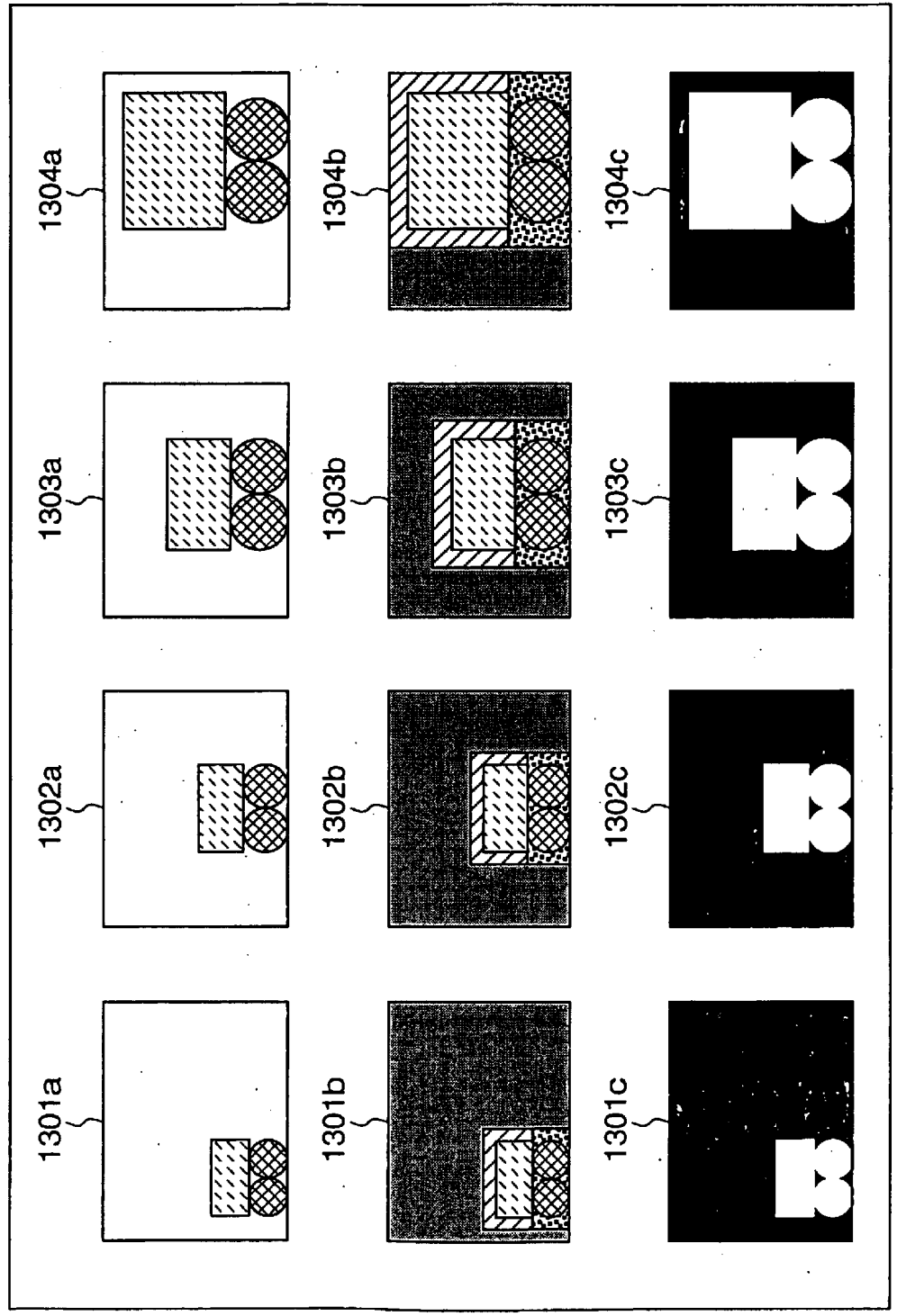
FIG. 13 is a diagram illustrating an example of screen displays after shape manipulation.

FIG. 13 is a diagram illustrating an example of screen displays after shape manipulation. Reference characters 1301c represent the result of reducing 1201c, and reference characters 1303c, 1304c represent the results of enlarging 1203c, 1204c, respectively. Until shape manipulation ends, the texture data and display image data on the screen remain 1201b to 1204b and 1201a to 1204a. At the stage where manipulation processing ends, the texture data of 1201b to 1204b is updated to 1301b to 1304b. At the same time, the display images 1201a to 1204a are updated to 1301a to 1304a.

Figure 14:
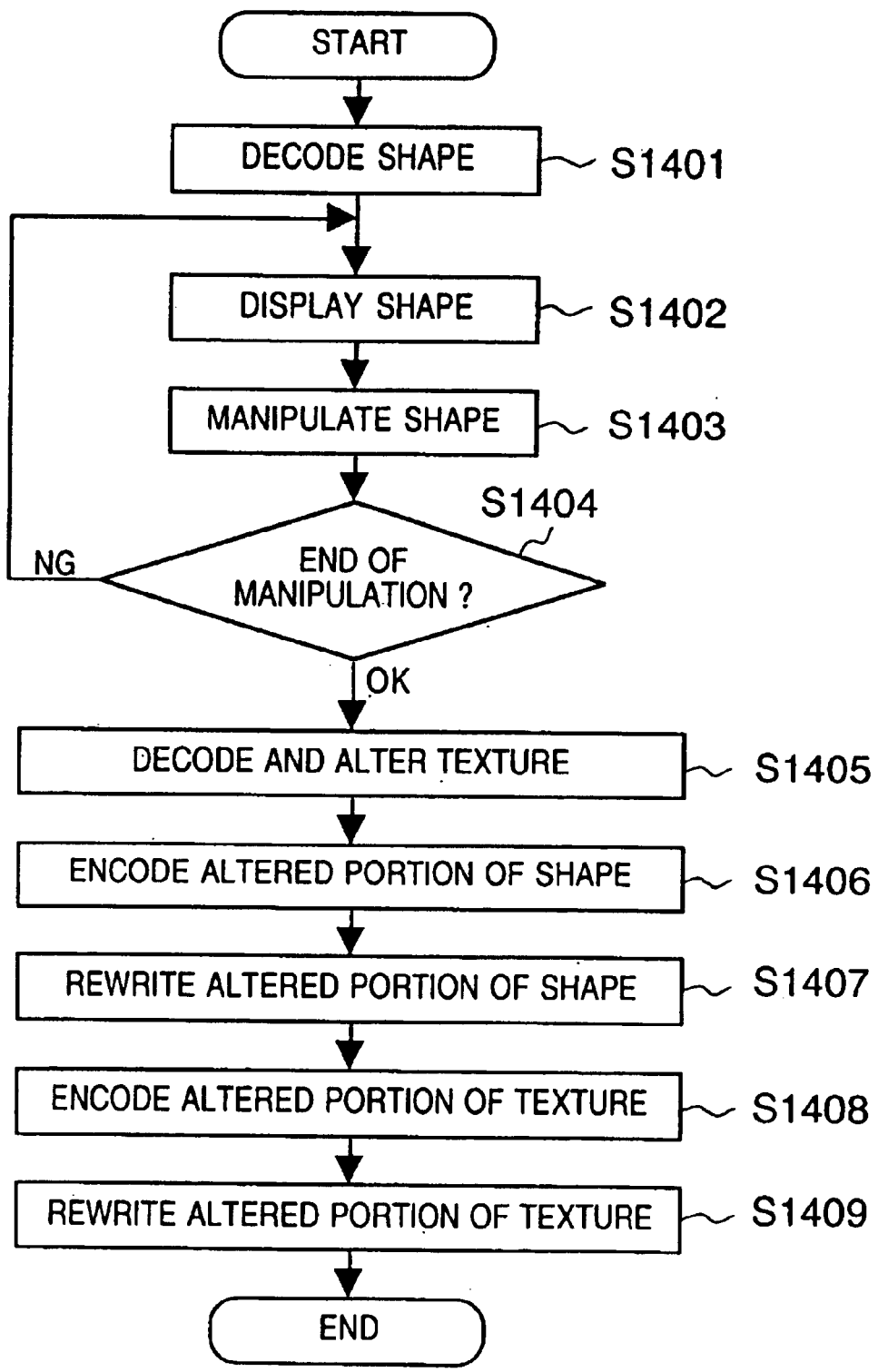
FIG. 14 is a flowchart illustrating processing of simple specifications according to the second embodiment.

In a case where processing is executed only for shape manipulation without a check based upon a display image being made from beginning to end, the related flowchart is as shown in FIG. 14. Specifically, after a shape has been decoded (step S1401), display of the shape (step S1402) and manipulation of the shape (step S1403) are repeated. If end of manipulation is instructed ("OK" at step S1404), texture is decoded for the first time (step S1405). Encoding of an altered portion is performed with regard to shape data (step S1406), partial rewrite of the bit stream accompanying this is performed (step S1407), re-encoding of an altered portion is performed with regard to texture data (step S1408), partial rewrite of the bit stream accompanying this is performed (step S1409) and then processing is exited. The screen display at this time is only 1201c to 1204c in FIG. 12 before shape manipulation and only 1301c to 1304c in FIG. 13 after shape manipulation.

The decision as to whether manipulation has ended is based upon detection of a command to end the manipulation of shape data in the foregoing embodiment. However, an arrangement may be adopted in which the decision as to whether manipulation has ended is based upon a command to switch the object whose shape data is to be manipulated.

Figure 15:
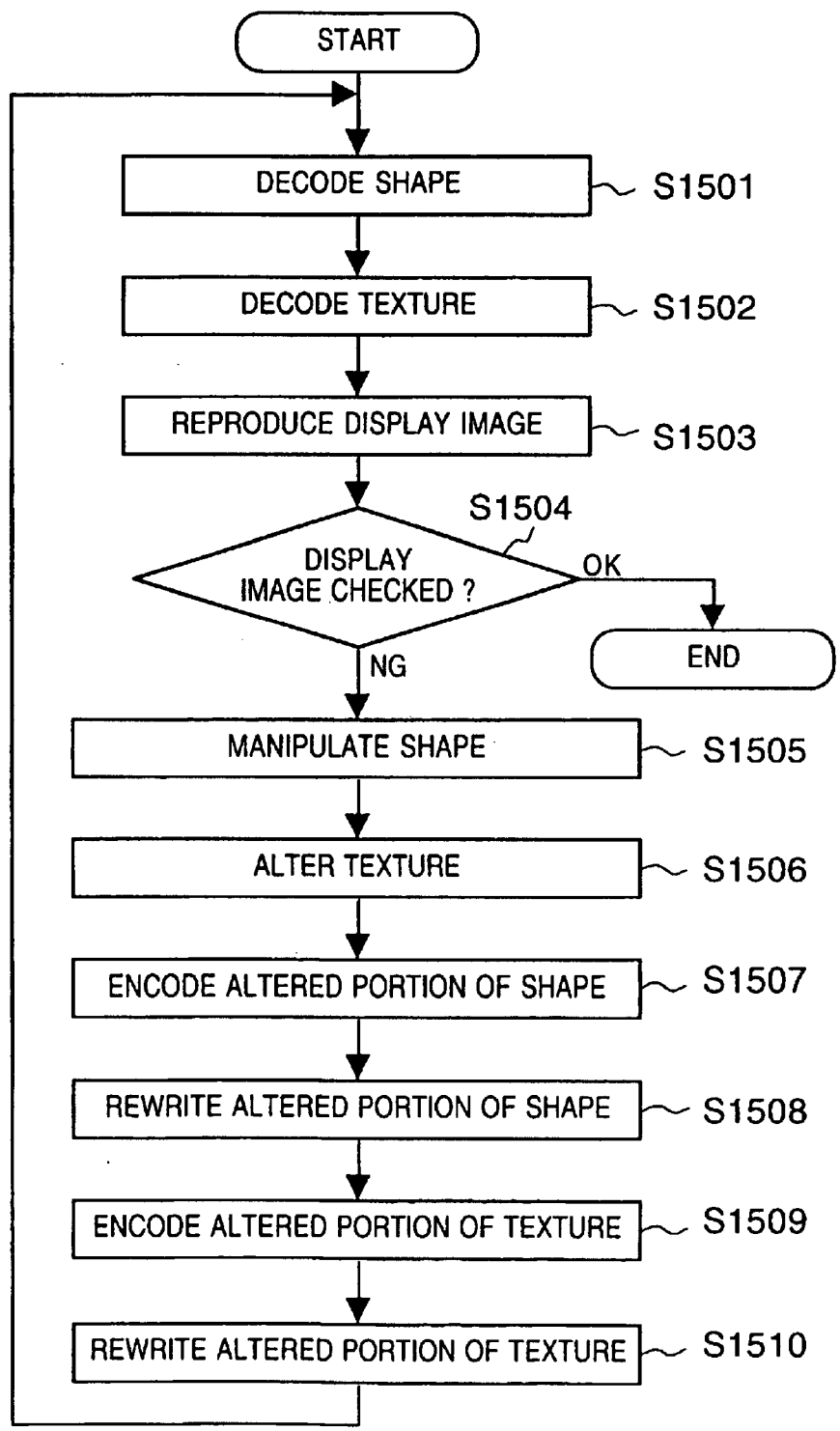
FIG. 15 is a flowchart illustrating processing of high specifications according to the second embodiment.

In the processing procedures of FIGS. 11 and 14, re-encoding is not carried out until shape manipulation ends. However, if processing speed allows, it is possible to perform the re-encoding of shape and texture whenever a shape is manipulated, as shown in FIG. 15. The processing from shape decoding (step S1501) to shape manipulation (step S1505) is similar to that of FIG. 11. However, at the same time that shape manipulation is carried out, texture is altered (step S1506), the altered portion of the shape is encoded (step S1507), the bit stream of the altered portion is rewritten (step S1508), the altered portion of texture is encoded (step S1509) and the bit stream of the altered portion is rewritten (step S1510). Control then returns to the beginning and the above-described processing is repeated until confirmation of the display screen ends.

Figure 16:
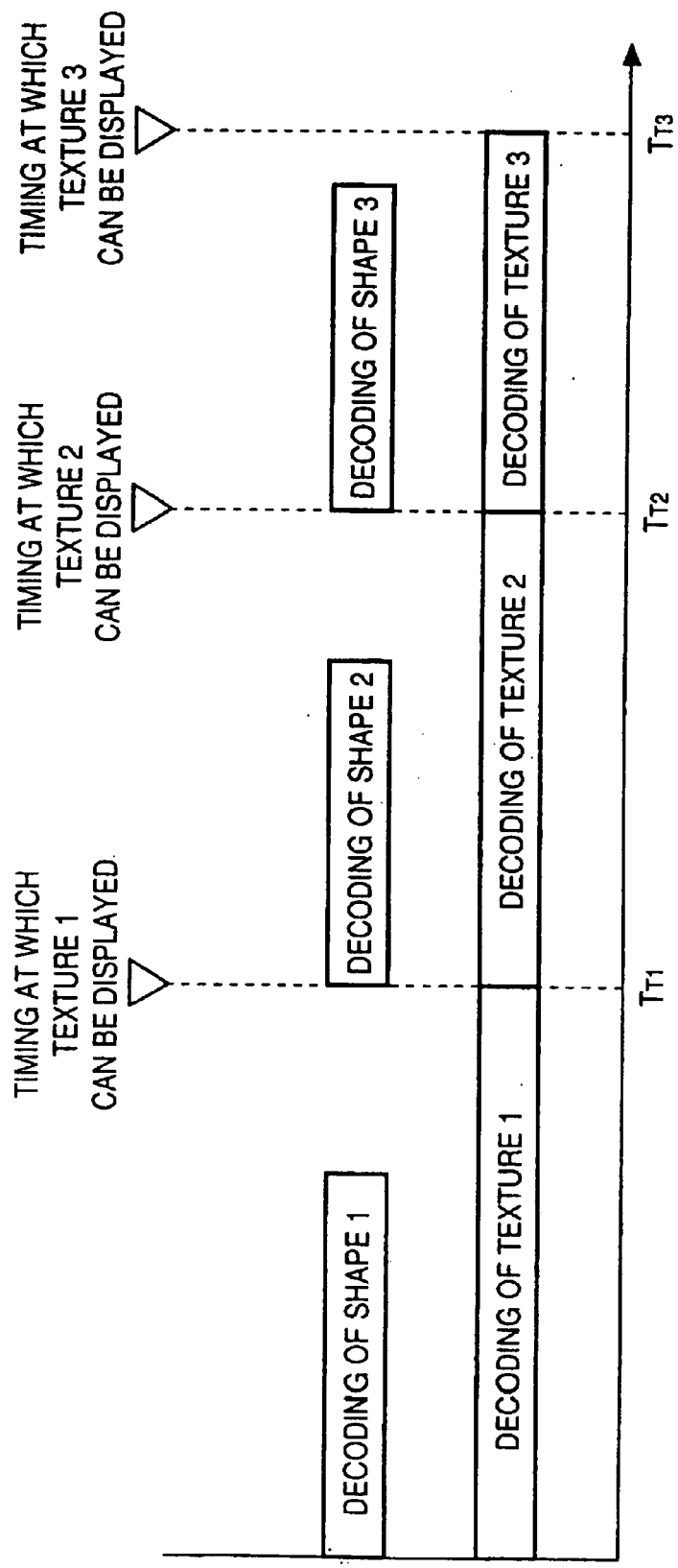
FIG. 16 is a timing chart when texture is displayed on a screen.
Figure 17:
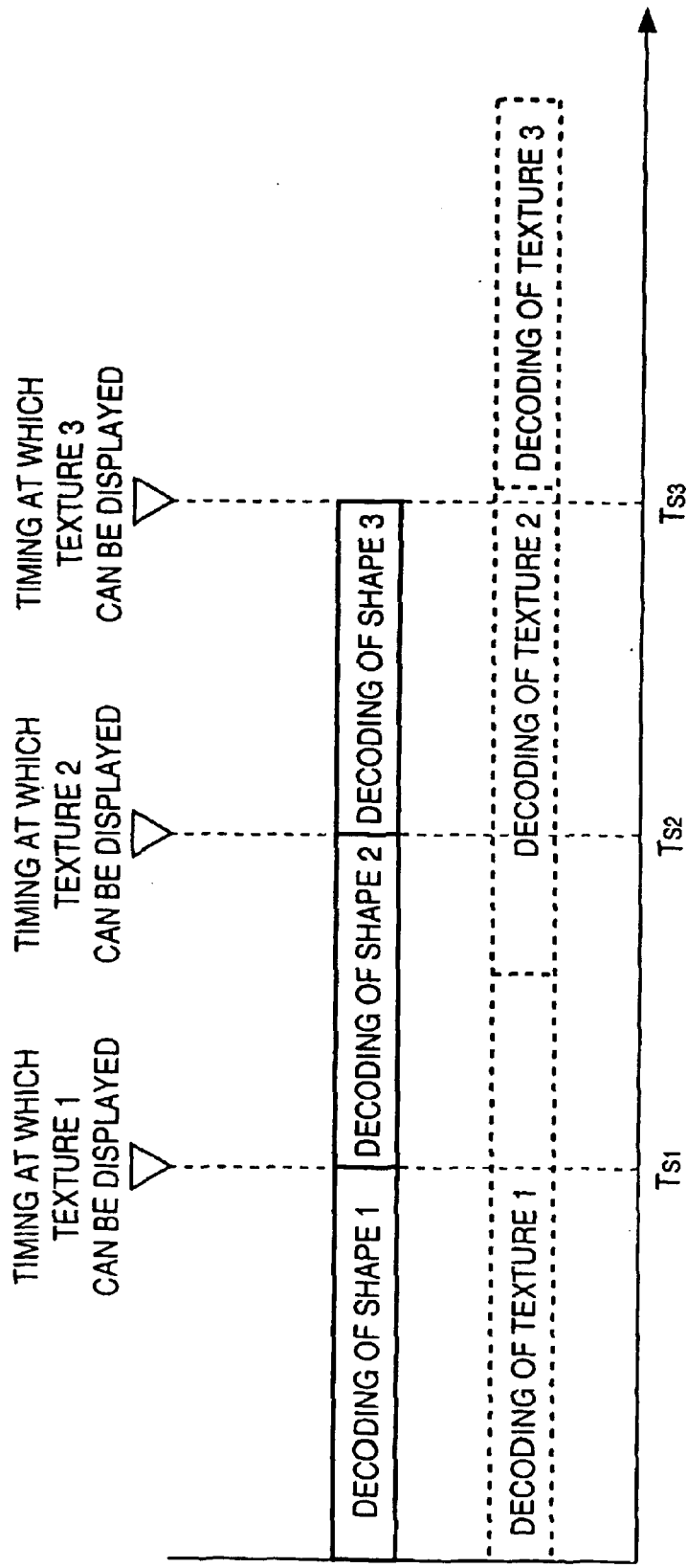
FIG. 17 is a timing chart when only shapes are displayed on a screen.

In the case of FIG. 15, shape and texture are processed as one set at all times. As a consequence, the amount of processing is fairly large in comparison with the case of FIG. 14. In general, the encoding and decoding of a shape involves shorter processing time than the encoding and decoding of texture. FIGS. 16 and 17 are diagrams useful in describing the difference between decoding time for a shape and decoding time for texture. In order to display an image, it is necessary that both shape and texture be decoded. Accordingly, the shortest time over which an image 1 can be displayed is the timing $T_{T1}$, at which decoding of texture 1 ends, and the shortest time over which an image 2 can be displayed is the timing $T_{T2}$, at which decoding of texture 2 ends. In a case where only a shape is displayed, the shortest time over which a shape 1 can be displayed is the timing $T_{S1}$, and the shortest time over which a shape 2 can be displayed is the timing $T_{S2}$. This means that the time which can be reduced per frame is $(T_{Ti}-T_{Si})$. If one sequence is N frames, then the total time reduction Tsum will be $$T\text{sum} = \sum_{i=1}^{n}(T_{Ti} - T_{Si})$$

It is also possible to change processing adaptively from the high-spec processing of FIG. 15 to the simple-spec processing of FIG. 15 in dependence upon the processing capability of the CPU.

Since interframe correlation is high in the encoding of a moving picture according to MPEG-4, processing for encoding a difference value between frames is executed. Processing using only the correlation within a frame is referred to as intraframe (I-frame) processing, processing using the correlation with the preceding frame is referred to an P-frame processing, and processing using the correlation between preceding and succeeding frames is referred to as B-frame processing. In order to decode a B-frame or a P-frame, the data of an I frame that is the source of the difference data is required. As a consequence, a large quantity of data must be dealt with and processing is complicated and time consuming. If an I-frame is decoded, on the other hand, much less processing suffices. In a case where a display is presented while downsampling frames, therefore, only the I-frames are processed.

Accordingly, it is possible to reduce the amount of processing by arranging it so that only an intraframe-coded (I-frame) image is displayed without decoding all texture.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium (or recording medium) storing the program codes of the software for performing the functions of the foregoing embodiments to a system or an apparatus, reading the program codes with a computer (e.g., a CPU or MPU) of the system or apparatus from the storage medium, and then executing the program codes. In this case, the program codes read from the storage medium implement the novel functions of the embodiments and the storage medium storing the program codes constitutes the invention. Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion card inserted into the computer or in a memory provided in a function expansion unit connected to the computer, a CPU or the like contained in the function expansion card or function expansion unit performs a part of or the entire process in accordance with the designation of program codes and implements the function of the above embodiment.

Thus, in accordance with the present invention, as described above, in the manipulation, editing and display of an image comprising a set of shape data and texture data, control is carried out in such a manner that texture data is manipulated after shape data is manipulated. As a result, it is possible to limit a decline in processing speed at the time of manipulation and to display or print a manipulated image rapidly. Efficient image editing is made possible as well.

As many apparently widely different embodiments of the present invention can be made without departing from the spirit and scope thereof, it is to be understood that the invention is not limited to the specific embodiments thereof except as defined in the appended claims.

What is claimed is:

1. An image editing apparatus comprising:
   input means for inputting image data having shape data and texture data;
   separation means for separating the image data into the shape data and texture data;
   shape manipulation means for transforming the shape data separated from the image data by said separation means so as to change a shape represented by the shape data; and
   texture manipulation means for transforming the texture data in conformity with result of transformation by said shape manipulation means.

2. The apparatus according to claim 1, further comprising display means for displaying shape data that has been transformed by said shape manipulation means.

3. The apparatus according to claim 1, further comprising display means for displaying an image based upon shape data that has been transformed by said shape manipulation means and texture data that has been transformed by said texture manipulation means.

4. The apparatus according to claim 1, wherein shape data and texture data constituting the image data input by said input means have been encoded, and said separation means further includes decoding means for decoding the encoded shape data and texture data.

5. The apparatus according to claim 1, wherein the image data input by said input means is image data representing one object of a plurality of objects constituting one screen.

6. The apparatus according to claim 1, further comprising encoding means for encoding shape data that has been transformed by said shape manipulation means and texture data that has been transformed by said texture manipulation means.

7. An image editing apparatus for editing object image data having shape data and texture data, comprising:
   first manipulation means for transforming shape data based upon a user operation so as to change a shape represented by the shape data;
   first display means for presenting a display of the shape data that reflects the transformation performed by said first manipulation means; and
   second manipulation means responsive to a predetermined operation, for transforming corresponding texture data in conformity with the manipulation of the shape data.

8. The apparatus according to claim 7, further comprising second display means for displaying an image based upon shape data that has been transformed by said first manipulation means and texture data that has been transformed by said second manipulation means.

9. The apparatus according to claim 7, wherein the predetermined operation associated with said second manipulation means is a command for ending an operation for transforming the shape data by said first manipulation means.

10. The apparatus according to claim 7, wherein the predetermined operation associated with said second manipulation means is an operation for switching a shape to be subjected to transformation by said first manipulation means.

11. The apparatus according to claim 7, further comprising extraction means for extracting shape data and texture data from object image data and supplying the shape data and texture data to said first and second manipulation means.

12. The apparatus according to claim 7, further comprising selection means for selecting one desired item of object image data if a plurality of items of object image data exist,
   wherein said extraction means extracts shape data and texture data from object image data that has been selected by said selection means.

13. An image editing apparatus comprising:
   read-out means for reading a bit stream, which has been compressed and encoded, out of a storage device;
   separation means for separating the bit stream, which has been read out by said read-out means, into at least a bit stream of shape information and a bit stream of texture information on a per-object basis;
   decoding means for decoding, object by object, each bit stream obtained by said separation means, thereby generating shape data and texture data;
   manipulation means for manipulating the shape data which has been obtained by said decoding means;

altering means for altering the texture data in conformity with the manipulation of the shape data by said manipulation means;

re-encoding means for re-encoding the shape data that has been manipulated by said manipulation means and the texture data that has been altered by said altering means; and write means for comparing a bit stream that has been re-encoded by said re-encoding means and the bit stream that has been obtained by said separation means, updating bit streams of portions that have been altered and writing the result to the storage device.

14. An image editing method comprising:

an input step, of inputting image data having shape data and texture data;

a separation step, of separating the image data into the shape data and texture data;

a shape manipulation step, of transforming the shape data separated from the image data in said separation step so as to change a shape represented by the shape data; and a texture manipulation step, of transforming the texture data in conformity with result of manipulation in said shape transformation step.

15. The method according to claim 14, further comprising a display step, of displaying shape data that has been manipulated in said shape manipulation step.

16. The method according to claim 14, further comprising a display step, of displaying an image based upon shape data that has been transformed in said shape manipulation step and texture data that has been transformed in said texture manipulation step.

17. The method according to claim 14, wherein shape data and texture data constituting the image data input in said input step have been encoded, and said separation step further includes a decoding step, of decoding the encoded shape data and texture data.

18. The method according to claim 14, wherein the image data input in said input step is image data representing one object of a plurality of objects constituting one screen.

19. The method according to claim 14, further comprising an encoding step of encoding shape data that has been transformed at said shape manipulation step and texture data that has been transformed at said texture manipulation step.

20. An image editing method for editing object image data having shape data and texture data, comprising:

a first manipulation step, of transforming shape data based upon a user operation so as to change a shape represented by the shape data;

a first display step, of presenting a display of the shape data that reflects the transformation performed in said first manipulation step; and a second manipulation step, responsive to a predetermined operation, of transforming corresponding texture data in conformity with the manipulation of the shape data.

21. The method according to claim 20, further comprising a second display step, of displaying an image based upon shape data that has been transformed in said first manipulation step and texture data that has been transformed in said second manipulation step.

22. The method according to claim 20, wherein the predetermined operation associated with said second manipulation step is a command for ending an operation for transforming the shape data in said first manipulation step.

23. The method according to claim 20, wherein the predetermined operation associated with said second manipulation step is an operation for switching a shape to be subjected to transformation in said first manipulation step.

24. The method according to claim 20, further comprising an extraction step, of extracting shape data and texture data from object image data and supplying the shape data and texture data for use in said first and second manipulation steps.

25. The method according to claim 20, further comprising a selection step, of selecting one desired item of object image data if a plurality of items of object image data exist, wherein said extraction step includes extracting shape data and texture data from object image data that has been selected in said selection step.

26. An image editing method comprising:

a read-out step, of reading a bit stream, which has been compressed and encoded, out of a storage device;

a separation step, of separating the bit stream, which has been read out in said read-out step, into at least a bit stream of shape information and a bit stream of texture information on a per-object basis;

a decoding step, of decoding, object by object, each bit stream obtained in said separation step, thereby generating shape data and texture data;

a manipulation step, of manipulating the shape data which has been obtained in said decoding step;

an altering step, for altering the texture data in conformity with the manipulation of the shape data in said manipulation step;

a re-encoding step, of re-encoding the shape data that has been manipulated in said manipulation step and the texture data that has been altered in said altering step; and a write step, of comparing a bit stream that has been re-encoded in said re-encoding step and the bit stream that has been obtained in said separation step, updating bit streams of portions that have been altered and writing the result to the storage device.

27. A storage medium storing a control program for causing a computer to execute image editing, said control program comprising:

code of an input step, of inputting image data having shape data and texture data;

code of a separation step, of separating the image data into the shape data and texture data;

code of a shape manipulation step, of transforming the shape data separated from the image data in said separation step so as to change a shape represented by the shape data; and code of a texture manipulation step, of transforming the texture data in conformity with result of transformation in said shape manipulation step after processing in said shape manipulation step ends.

28. A storage medium storing a control program for causing a computer to execute image editing processing for editing object image data having shape data and texture data, said control program comprising:

code of a first manipulation step, of transforming shape data based upon a user operation so as to change a shape represented by the shape data;

code of a first display step, of presenting a display of the shape data that reflects the transformation performed in said first manipulation step; and code of a second manipulation step, responsive to a predetermined operation, of transforming corresponding texture data in conformity with the transformation of the shape data.

29. A storage medium storing a control program for causing a computer to execute image editing, said control program comprising:

code of a read-out step, of reading a bit stream, which has been compressed and encoded, out of a storage device;

code of a separation step, of separating the bit stream, which has been read out in said read-out step, into at least a bit stream of shape information and a bit stream of texture information on a per-object basis;

code of a decoding step, of decoding, object by object, each bit stream obtained in said separation step, thereby generating shape data and texture data;

code of a manipulation step, of transforming the shape data which has been obtained in said decoding step;

code of an altering step, for altering the texture data in conformity with the manipulation of the shape data in said manipulation step;

code of a re-encoding step, of re-encoding the shape data that has been manipulated in said manipulation step and the texture data that has been altered in said altering step; and code of a write step, of comparing a bit stream that has been re-encoded in said re-encoding step and the bit stream that has been obtained in said separation step, updating bit streams of portions that have been altered and writing the result to the storage device.

* * * * *